United States Patent

Lee

[15] 3,676,873

[45] July 11, 1972

[54] MAGNETIC BUBBLE CROSSOVER CIRCUIT

[72] Inventor: Fred S. Lee, Phoenix, Ariz.

[73] Assignee: Honeywell Information Systems Inc., Waltham, Mass.

[22] Filed: Nov. 1, 1971

[21] Appl. No.: 194,375

[52] U.S. Cl. ....................................340/174 TF, 340/174 SR

[51] Int. Cl. ....................................G11c 11/14, G11c 19/00

[58] Field of Search ...............................340/174 TF, 174 SR

[56] References Cited

UNITED STATES PATENTS 3,191,054 6/1965 Ghisler et al. ....................340/174 TF 3,543,255 11/1970 Morrow et al. ....................340/174 TF

*Primary Examiner*—Stanley M. Urynowicz, Jr.
*Attorney*—Dudley T. Ready, Fred Jacob and Edward W. Hughes

[57] ABSTRACT

A magnetic bubble crossover circuit is provided in which the circuit paths are defined by an array of magnetic elements overlaying a magnetic bubble propagation substrate. A magnetic bias field provides bubble stability in the substrate and a rotating magnetic field causes the bubbles to propagate along the defined circuit paths. At the crossover point, in the array of magnetic elements, a common element is provided which has the property of steering the bubbles in respective paths so that they pass through separated in time and space.

6 Claims, 8 Drawing Figures

Patented July 11, 1972 3,676,873

2 Sheets-Sheet 1

INVENTOR.
F. S. LEE

2 Sheets-Sheet 2

MAGNETIC BUBBLE CROSSOVER CIRCUIT

FIELD OF THE INVENTION

This invention relates to magnetic bubble devices in which general or special purpose logic and/or storage functions are preformed for digital data processing applications or systems.

BACKGROUND OF THE INVENTION

The types of magnetic bubble devices considered here are of the kinds described in the Bell Laboratory Record, June/July 1970, pages 163–169. These devices are comprised of a substrate of anisotropic magnetic material such as yttrium orthoferrite and garnets, having an easy magnetization axis normal to the substrate. A permanent magnetic bias field is applied through the substrate, perpendicularly, and has a strength within a range such that bubbles in the form of cylindrical domains of uniform magnetization, in a direction opposite to the bias field, are maintained in a stable state indefinitely. Placed over the surface of the bubble substrate is an array of magnetic elements which determines preferred locations for the bubbles and constrains the direction of bubble motion in the presence of perturbations in the magnetic field applied to the bubble substrate. The magnetic elements are conveniently a permalloy material applied with standard photolithographical processes. The devices enable representation of binary information by the presence or absence of a bubble. The manner in which the array constrains and steers the bubbles defines the logical operation of the device. Dynamic operation of the device is conveniently provided by applying a rotating magnetic field in the plane of the substrate.

One constraint on bubble memories of the types considered is that they are two-dimensional planar devices which creates a general interconnection problem. As is well known, even for two sets of three points, one cannot make all combinations of connections in a single plane, pairing points without crossovers. It is therefore obvious that for magnetic bubble devices to have completely general utility, it is necessary to provide mechanisms which enable crossovers of interconnections between pairs of storage locations. The present invention consists of providing such crossover circuits for magnetic bubble devices.

It has been found that in those symmetrical devices investigated in which bubble paths cross, when bubbles on both paths try to cross over during the same cycle, the mutually repelling magnetic force between the bubbles causes them to block one another. Attempts to steer bubbles around one another by adding elements to the array to steer the bubbles around one another have either failed to eliminate the blocking or have created arrays which lock up the bubbles, preventing propagation past the crossover point.

BRIEF SUMMARY OF THE INVENTION

The invention uses devices of the type described above which have a magnetic bubble substrate, an array of magnetic elements over the substrate for steering the bubbles, a bias field for maintaining stable bubbles, and a rotating field for moving the bubbles. In the embodiments described, the bubble steering elements are generally T-shaped or Y-shaped elements alternating with elongated bar elements to form paths for synchronous motion of the bubbles in response to the rotating field. A common crossover steering element is provided which is effectively a T-shaped element for a first path and is effectively a Y-shaped element for a second path. For bubbles in both paths crossing the common element, during the same cycle, the configuration of the common steering element is such that the crossing bubbles are separated, in time and space, while crossing a common point. The Y-shaped element arm, or the equivalent thereof, is the unique feature which enables bubbles to cross by momentarily retarding one of the bubbles at the tip of the arm.

DETAILED DESCRIPTION OF THE INVENTION

Figures 1, 2, 3:
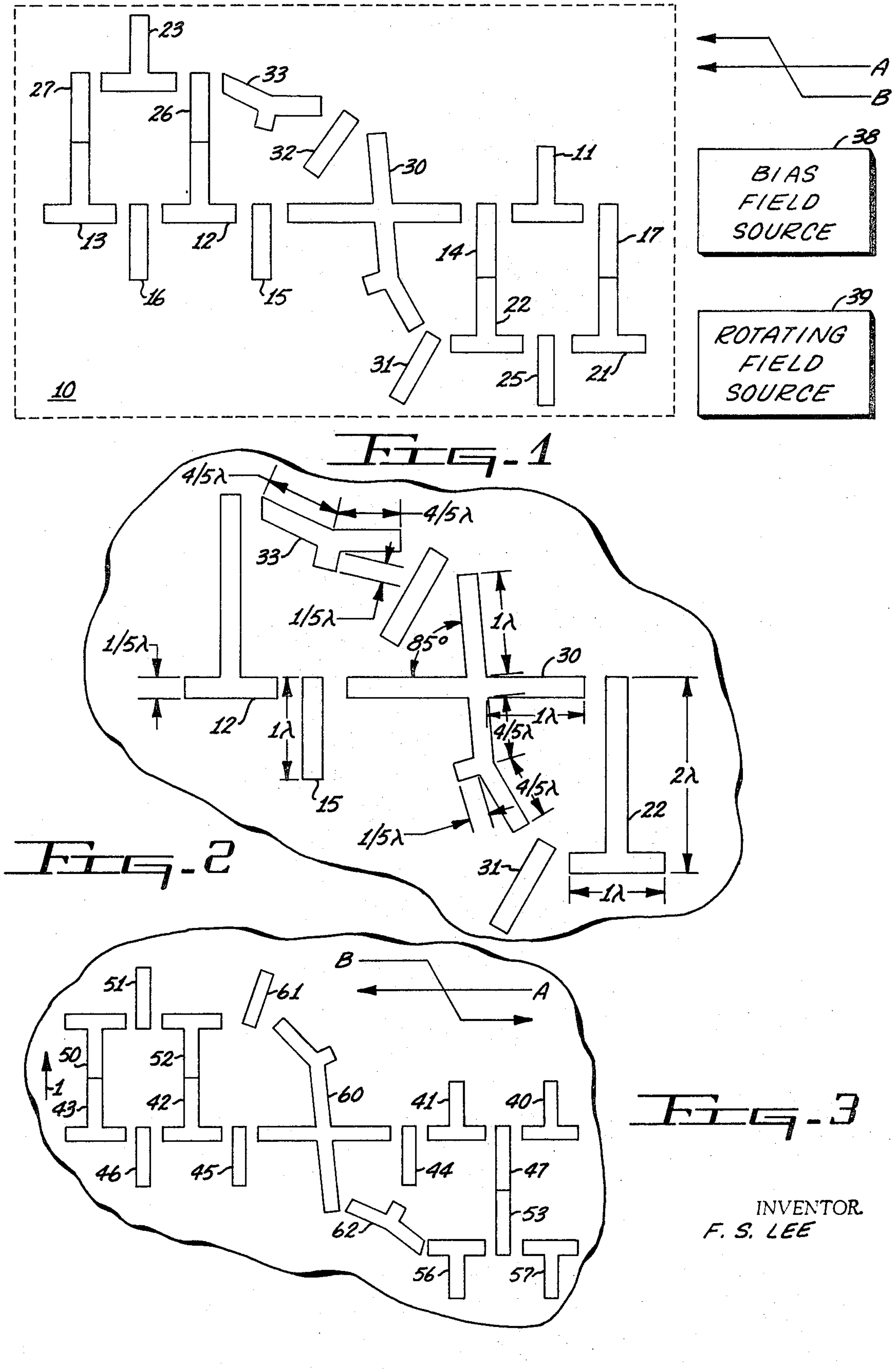
FIG. 1 is a view, in elevation, of one embodiment of the invention in which parallel magnetic bubble paths, in a circuit, cross over with bubbles propagating in the same direction.
FIG. 2 shows the central portion of the FIG. 1 circuit illustrating the geometric characteristics of the circuit in greater detail.
FIG. 3 is a similar view of a second embodiment of the invention in which bubbles are propagated along paths in opposite directions.

A preferred embodiment of the invention, for parallel bubble paths with information flow in the same direction, is shown in FIG. 1. On the magnetic bubble substrate 10, T-shaped elements 11–13, together with elongated bar elements 14–17, form crossover originating and destination portions of a first path A. T-shaped elements 21, 22 and 23 and elongated bar elements 25, 26 and 27 form originating and destination portions of a second path B. Although adjacent functional elements such as 25 and 12 are shown as separate elements, they are conveniently formed as a single integral element, as shown in FIG. 2. The crossover circuit centers on an irregularly shaped element 30 common to both paths. For the first path, the upper portion of the common element 30 serves as a T-element interconnecting the originating and destination portions. For the second path, an elongated bar element 31 serves as a link between the T-shaped element 22 and a storage location defined by the lower portion of the common element 30. The second path then extends upward, across the common element 30 and the linking elements 32 and 33 to destination elements 26 and 23. Blocks 38 and 39 schematically represent the magnetic bias field source and the rotating field source necessary to the operation of the circuit.

FIG. 2 shows a portion of the FIG. 1 circuit enlarged further and includes dimensional data and the geometrical relationship of the elements. The absolute dimensions of the array elements are basically determined by the material used for the bubble propagating substrate, because the properties of the material determine the range of stable bubble sizes, which are approximately 3 microns in width in garnet. The relative dimensions of the array are based on the unit length of the elongated bar element, such as element 15. The horizontal and upper vertical arms of the central element 30 are each the length of the unit element. The lower arm has the same shape as a regular Y-shaped element, having arms four fifths and a leg one fifth of a unit element. The vertical arm is tilted 5° to enhance the desired bubble crossover timing, delaying the bubble in the second path. All of the elements have a width of one-fifth of the unit element.

FIG. 3 illustrates a second embodiment of the invention in which the crossing paths have opposite directions of bubble propagation. The first path A is essentially the same as in FIG. 1. Elements 40, 47, 41 and 44 form an originating portion of the first path and elements 45, 42, 46 and 43 form a destination portion. For the second path B, elements 50, 51 and 52 form an originating portion and elements 56, 53 and 57 form a destination portion. The common element 60 provides an interconnection for the first path between elements 44 and 45. Common element 60, together with elements 61 and 62, form a crossover interconnection for the second path, between elements 52 and 56.

For the purpose of discussion, an arrow 1 is shown in FIG. 3 indicating a reference orientation from which directions are measured. As is well known for magnetic bubble circuits of the type shown and described herein, when a magnetic field is applied in the plane of the bubble substrate, parallel to the bar elements (assuming a bias field normal to the bubble substrate), a magnetic bubble under a bar takes a position under the tip of the bar. From an elevation point of view, with the bias field in an upward direction and with the transverse field in a direction parallel to the reference arrow 1, a bubble, under a bar element parallel to the transverse field, positions itself under the upper tip of the bar element. For a T-shaped element having the same orientation, a bubble under the element positions itself under the upper tip of the element, in the middle of the crossing portion of the element. Similarly, if the transverse field has an orientation of 180°, a bubble will place itself under the lower tip of the element. However, with the proper geometric configuration of overlay elements and the rotation of the transverse field, the bubbles are propagated along a desired path. Such a path inherently performs shift register functions and, if desired, logic functions can be implemented by providing interactions between bubbles. An example of a magnetic bubble device employing the shift register function is described in U.S. Pat. No. 3,599,190, which also includes a description of one of the approaches to introducing and sensing bubbles for such devices.

Figure 4:
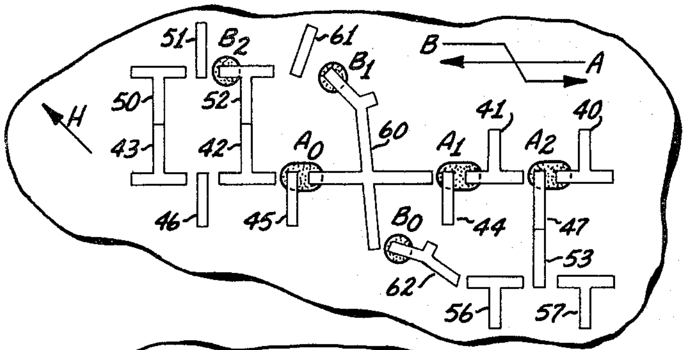
FIGS. 4–8 comprise a set of diagrams illustrating how bubbles are propagated in the FIG. 3 circuit.
Figure 5:
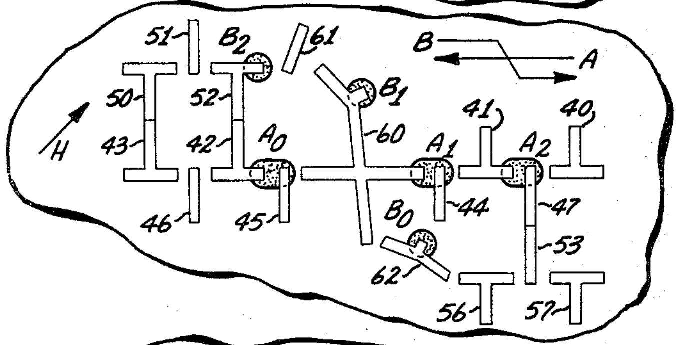
Figure 6:
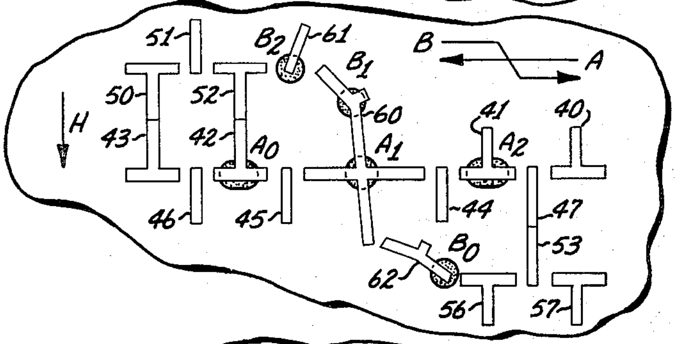
Figure 7:
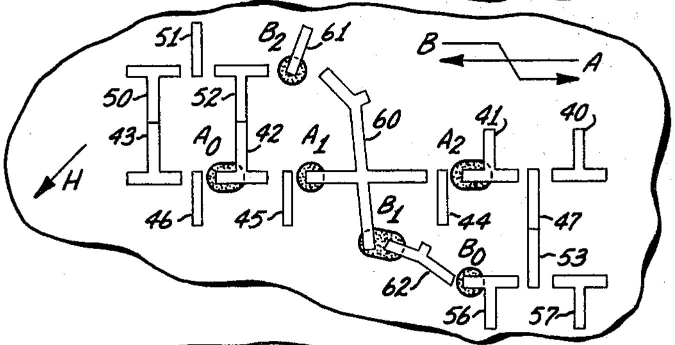
Figure 8:
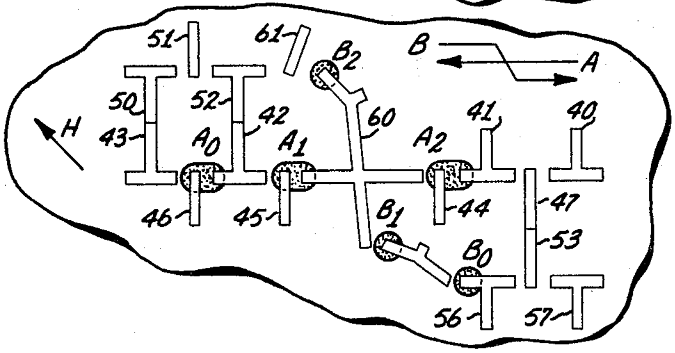

FIGS. 4–7 illustrate the propagation of bubbles across the FIG. 3 crossover circuit, where bubbles $A_0$, $A_1$ and $A_2$ are successive bubbles on the first path and $B_0$, $B_1$ and $B_2$ are successive bubbles on the second path. For the purpose of this explanation, the bubbles can be considered to be magnets with the direction of magnetization normal to the substrate and upper portion being a south or negative pole. In FIG. 4, the positions for the bubbles is shown for the rotating field H having an orientation of approximately 315°0 . The first bubble $A_0$ is on the leftmost end of the common element 60, essentially a positive pole. In FIG. 5, the rotating field has progressed clockwise to an orientation of approximately 45°, whereby the bubble has moved to the left under the top of element 45 and is shared with the right tip of T-shaped element 42. In FIG. 6, the rotating field has progressed to an orientation of approximately 180° so that bubble $A_0$ is under the bottom, center, of element 42. In FIG. 7, the rotating field has an orientation of approximately 225° so that bubble $A_0$ has shifted to the left end of element 42. In FIG. 8, the rotating field has completed the cycle, returning to an orientation of approximately 315°, with bubble $A_0$ starting its shift under element 46. The movement of bubble $A_2$ is synchronized with movement of bubble $A_1$. It moves across element 44 and common element 60. The common element 60 is effectively a T-shaped element for the first path.

For the second path, the bubbles move in synchronization in the same manner as the bubbles in the first path, but 180° out of phase with the first path. The Y-shaped element 62 is an example of a path guiding element variation from the T-shaped elements. In a sense, the upper portion of the common element 60 acts as a modified Y-shaped element for the bubble $B_1$. The bubble makes essentially a standard progression from FIG. 4 to FIG. 5, but because of the configuration which has the Y-shaped element portion rotated about 45° relative to the direction of the origin portion of the path, the bubble movement to element 62 is effectively delayed 45°. Accordingly, bubble $B_1$ is delayed in crossing the center of the common element 60. As seen in FIG. 6, as bubble $A_1$ crosses the center of element 60, bubble $B_1$ is held in the upper portion of element 60, separated by approximately three bubble diameters so that there is effectively no bubble interaction. In FIG. 7, bubble $B_1$ has crossed behind bubble $A_1$, reached the Y-shaped element 62, and has partly caught up to the normal phase in the destination portion of the second path. As can be observed from following the progression of bubble $B_0$ across element 62 in the sequence of FIGS. 4–8, the bubbles in the second path completely catch up to the normal phase in the second path during the cycle following the crossing of common element 60.

In FIGS. 4–8, it can be seen that the bottom tip of central element 60 serves as a positive pole for the second path B, but it does not attract a bubble moving along the first path A. As seen in FIG. 8, with the magnetic field at 315°, bubble $B_1$ is under this tip. However, in FIG. 6, even with the field at 180°, the bubble $A_1$ does not move to the bottom of central element

60, as one might expect. The salient features of the central element are that it presents portions with path steering elements for both paths and that these portions are oriented so that bubbles cross over the common point at different orientations of the field.

Representative embodiments illustrative of the invention have been shown and described. Different arrangements incorporating the principles of the invention may be used. For example, the use of T-shaped and Y-shaped magnetic elements may be replaced by equivalent bubble path steering elements. Furthermore, other common crossover steering elements which separate the crossing bubbles in time and space can be used.

What is claimed is:

1. A magnetic bubble device crossover circuit in which bubbles are maintained by a magnetic bias field comprising:

A. a substrate for propagating magnetic bubbles;

B. first and second origin sets of magnetic elements positioned over said substrate located in such a manner as to provide origin portions of first and second bubble paths, respectively;

C. first and second destination sets of magnetic elements positioned over said substrate located in such a manner as to provide destination portions of first and second bubble paths, respectively;

D. a common magnetic element positioned over said substrate located in such a manner as to provide crossover paths for both said first and second bubble paths and having a geometrical configuration such that bubbles cross over between their respective origin and destination path portions separated in time and space during the same cycle of propagation.

2. The magnetic bubble crossover circuit of claim 1 further comprising:

E. said common magnetic element having a configuration with one portion providing a bubble steering element for completing said first path and with a second portion providing a bubble steering element for completing said second path in such a manner that a bubble propagating along said second path is delayed relative to bubble propagation across the common point along said first path.

3. The magnetic bubble crossover circuit of claim 2 further comprising:

F. a source of rotating magnetic field in the plane of said substrate for cyclically moving said bubbles along their respective paths.

4. The magnetic bubble crossover circuit of claim 1 further comprising:

E. said common magnetic element having a geometrical configuration such that it acts as a T-shaped element for said first path and a Y-shaped element for said second path.

5. The magnetic bubble crossover circuit of claim 1 further comprising:

E. said common magnetic element having a configuration with one portion providing a bubble steering element for completing said first path and with a second portion providing a bubble steering element for completing said second path in such a manner that a bubble propagating along said second path is delayed relative to bubble propagation across the common point along said first path with one portion configured as a T-shaped element and a second portion configured as a Y-shaped element.

6. A magnetic bubble crossover circuit comprising:

A. a bubble substrate of magnetically anisotropic material with its easy axis normal to the substrate;

B. a magnetic bias field normal to said substrate having a field strength within the range in which magnetic bubbles are stable;

C. a magnetic rotating field parallel to said substrate;

D. a first array portion of magnetic elements positioned proximate to said substrate in such a manner that bubbles are propagated along a first path in response to said rotating field;

E. a second array portion of magnetic elements positioned proximate to said substrate in such a manner that bubbles are propagated along a second path crossing said first path in response to said rotating field;

F. said arrays having an element in common at the crossover point including, 1. a first portion having a configuration to hold a bubble in said second path in a location three bubble diameters from the point of bubble crossover when a bubble in said first path crosses the common point of said paths,
2. a second portion having a configuration which steers a bubble in said first path across said common point and to hold said bubble at a location approximately three bubble diameters beyond said common crossover point,
3. said common element portions having relative orientations such that bubbles cross said common crossover point at different orientations of said rotating field.

* * * * *